Nov. 29, 1932.  E. J. COWAN  1,889,544

INSULATING CASING CONDENSER ASSEMBLY

Filed March 13, 1929

INVENTOR.
Edward J. Cowan
BY Philip Farnsworth
ATTORNEY.

Patented Nov. 29, 1932

1,889,544

UNITED STATES PATENT OFFICE

EDWARD J. COWAN, OF DEDHAM, MASSACHUSETTS, ASSIGNOR, BY MESNE ASSIGNMENTS, TO GENERAL ELECTRIC COMPANY, A CORPORATION OF NEW YORK

INSULATING CASING CONDENSER ASSEMBLY

Application filed March 13, 1929. Serial No. 346,525.

This invention relates to an improved capacitor assembly, and more particularly to a novel means adapted to prevent the sagging of horizontally disposed capacitor units.

In a previous application, S. N. 324,307 filed December 6, 1928, there has been disclosed a variety of capacitor assemblies, in which the several units have been horizontally disposed in order to permit their ready installation and servicing without involving any great amount of expense in materials and labor.

It has now been found that further economies in installation and upkeep costs, as well as added strength in a capacitor assembly, may be secured by the use of the improved means of the present invention.

Figure 1:
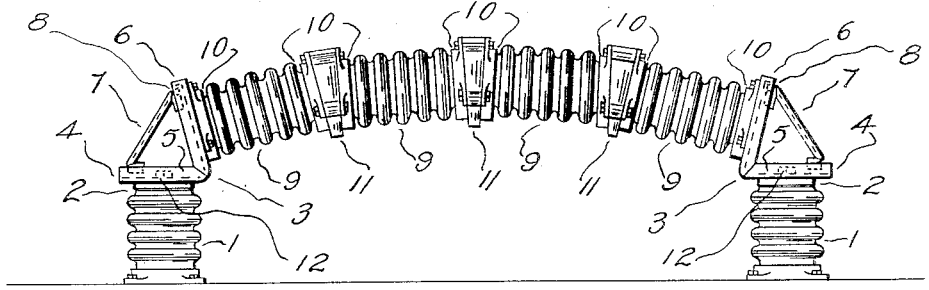
Figure 2:
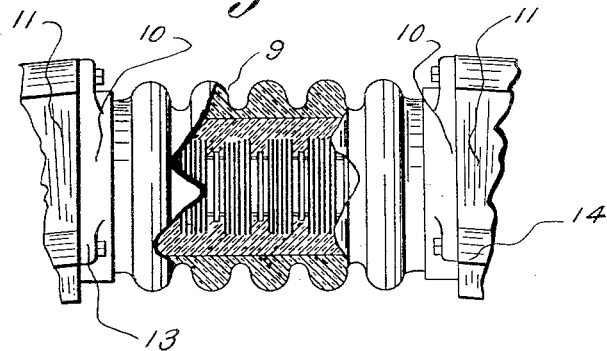
Figure 3:
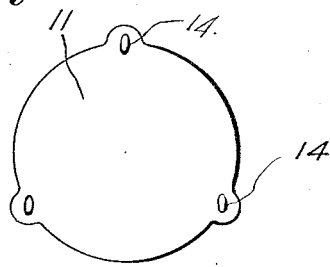
Figure 4:

The drawing illustrates an embodiment of the invention in an exemplary form of capacitor assembly, Fig. 1 being a side elevation of the assembly of a plurality of capacitor units 9; Fig. 2 being a similar view of a portion of said assembly but including only one unit 9 and adjacent parts of the assembly including keystone fillers 11, a portion of this single unit being drawn in section to provide a showing of interior parts in section; Figs. 3 and 4 being views of one of the keystone fillers of Figs. 1 and 2, Fig. 3 being an end face elevation and Fig. 4 being a side view of a filler as it appears in the assembly shown in Fig. 1.

In the drawing, there is shown an improved capacitor assembly, including base insulators 1, of any suitable size and configuration. These insulators may be suitably mounted, as on concrete bases, not shown, and they are so chosen as to give a desired support to the capacitor assembly now to be described.

Mounted on the tops of the insulators and attached to the metal end caps 2 thereof, are the supporting members for the capacitor assembly, designated generally by the numeral 3. These members comprise base portions 4 of channel iron or the like, and are provided with the usual side flanges 5, which serve to act as stiffening members. The members 4 are integrally secured to like members 6 in any suitable manner, as by welding, or brazing, or members 4 and 6 may be formed of a single piece of stock and suitably shaped, for purposes to appear more fully hereinafter.

Braces 7, of angle iron, or other suitably configured material, having the requisite mechanical and electrical properties, are so positioned and arranged as to provide the necessary rigidity and mechanical strength to the members 3. Members 7 are secured to parts 4 and 6 by an angle cross member 8 by welding, or they may be attached thereto in their cooperative relationship by bolts and nuts, not shown, or by rivets, also not shown.

The structures 3 are attached to the bases 1 in any desired manner, as by the bolts 12. These bolts are adapted to secure the brace structures to the metal end caps, and may be made of any suitable material, such as phosphor bronze or galvanized iron.

The angular relation of members 6 with members 4 may be varied, as desired, the supporting braces 7 being varied in length to secure their optimum position.

Interposed between the supporting bases and their associated members 3, are the capacitor units 9. These units may be of any suitable construction, and preferably comprise insulation-sided casings having series stack condensers therein, and provided with metal ends 10, which serve as terminals for the stacks and also as devices for mounting the capacitor units. The metal ends 10 may be provided with mounting lugs 13, or with any other devices necessary for their attachment to suitable supports.

The end sections are secured to the supporting members 3 by bolts and nuts, not shown, or in any other suitable manner, as will readily be apparent to those skilled in the art. The intermediate sections are secured to each other and to the end sections in an improved manner, now to be described.

Interposed between adjacent ends of the capacitors of the assembly, and in good electrical and mechanical contact therewith are the wedge shaped members 11, whose function is briefly as follows. The wedges, o keystone fillers, of aluminum, iron, or any other suitable material, are adapted to permit the weight of the horizontally disposed capacitors to be more evenly distributed on the members 3, by raising the central horizontal axes of the units well above the horizontal, the resulting assembly approximating a keystone arch in its general configuration.

It will be seen that by varying the angular dimensions of the wedges or keystone fillers, the several capacitor units can be angularly disposed with respect to each other, so as to minimize the effect of their weight, in a straight downward thrust, and distribute it effectively in lateral directions towards the supported ends. It will, of course, be understood that the end supports 3 will be suitably configured to accommodate any desired angularity in the dispostion of the units of the assembly.

Where desired, the invention comprehends the use of capacitor units whose terminal sections are so configured as to provide the necessary angularity between adjacent units in order to secure the desired arching of the assembly without resorting to the use of the keystone fillers above noted.

Such an arrangement, as above described, permits the use of relatively heavy capacitor units in the assembly, while minimizing the inherent difficulties of mechanical association, as well as the tendency of the assembly to sag in its central portions, as would normally be expected in structures of any great weight and length.

The keystone fillers 11 may be suitably apertured at 14 to receive bolts and the like, by means of which they may be secured in good mechanical and electrical relation with the abutting capacitors. Where desired, the wedges may be approximately positioned between the successive capacitors of the assembly, and then brazed, or welded at their edges, to the metal terminal ends of the capacitors. The use of a suitable, soft, brazing metal, or filler rod would permit a desired compensation for any expansion or contraction of the metal portions of the structures encountered under the varying climatic conditions to which they might be subjected in use.

It will now be appreciated that there has been provided a novel means for preventing the sagging of horizontally disposed capacitor units when arranged and set up under service conditions, and the improved capacitor assembly resulting by the practice of this invention, and since the underlying features may be incorporated in other specific mechanical devices, it is not intended to be limited to that herein shown, except insofar as such limitations are imposed by the appended claims.

What is claimed is:

1. A capacitor assembly, including a plurality of insulating bases, angularly disposed channel shaped supports rigidly secured to each base, and a plurality of capacitor units mechanically and electrically connected at their ends to the supports and arched between said supports.

2. A capacitor assembly, including a plurality of insulating bases, angularly disposed channel shaped supports rigidly secured to each base, a plurality of capacitor units mechanically and electrically connected at their ends to the supports, and a plurality of keystone fillers interposed between the several units, and in good mechanical and electrical contact therewith.

3. A capacitor assembly, including a plurality of insulating bases, angularly disposed channel shaped members of conductive material rigidly secured to the supports and extending upwardly therefrom, a plurality of capacitor units connected at each end to the members and angularly disposed with respect to each other, and wedge shaped members interposed between and in good electrical and mechanical contact with the said units, whereby the channel shaped members are adapted to serve as terminals of opposite polarity.

4. A capacitor assembly, including a plurality of insulating bases, angularly disposed channel shaped supports rigidly secured to each base, a plurality of capacitor units mechanically and electrically connected at their ends to the supports, and a plurality of keystone fillers interposed between the several units and in good mechanical and electrical contact therewith whereby to prevent the sagging of the said units.

5. A capacitor assembly, including a plurality of insulating bases, angularly disposed channel shaped members of conductive material rigidly secured to the supports and extending upwardly therefrom, a plurality of capacitor units connected at each end to the members and angularly disposed with respect to each other, and wedge shaped members interposed between and in good electrical and mechanical contact with the said units, whereby the channel shaped members are adapted to serve as terminals of opposite polarity and the assembly is prevented from sagging.

6. A capacitor assembly, including a plurality of insulating bases, angularly disposed channel shaped members of conductive material rigidly secured to the supports and extending upwardly therefrom, a plurality of capacitor units connected at each end to the members and angularly disposed with respect to each other in good electrical and mechanical contact, said members being provided with suitably configured end portions adapted to impart an arched shape to the capacitor assembly.

7. A capacitor assembly, including a plurality of insulating bases, angularly disposed channel shaped members of conductive material rigidly secured to the supports and extending upwardly therefrom, a plurality of capacitor units connected at each end to the members and angularly disposed with respect to each other in good electrical and mechanical contact, said members being provided with suitably configured end portions adapted to impart an arched shape to the capacitor assembly whereby the channel shaped members are adapted to serve as terminals of opposite polarity and the assembly is prevented from sagging.

In testimony whereof I hereunto affix my signature.

EDWARD J. COWAN.